Patented June 7, 1938

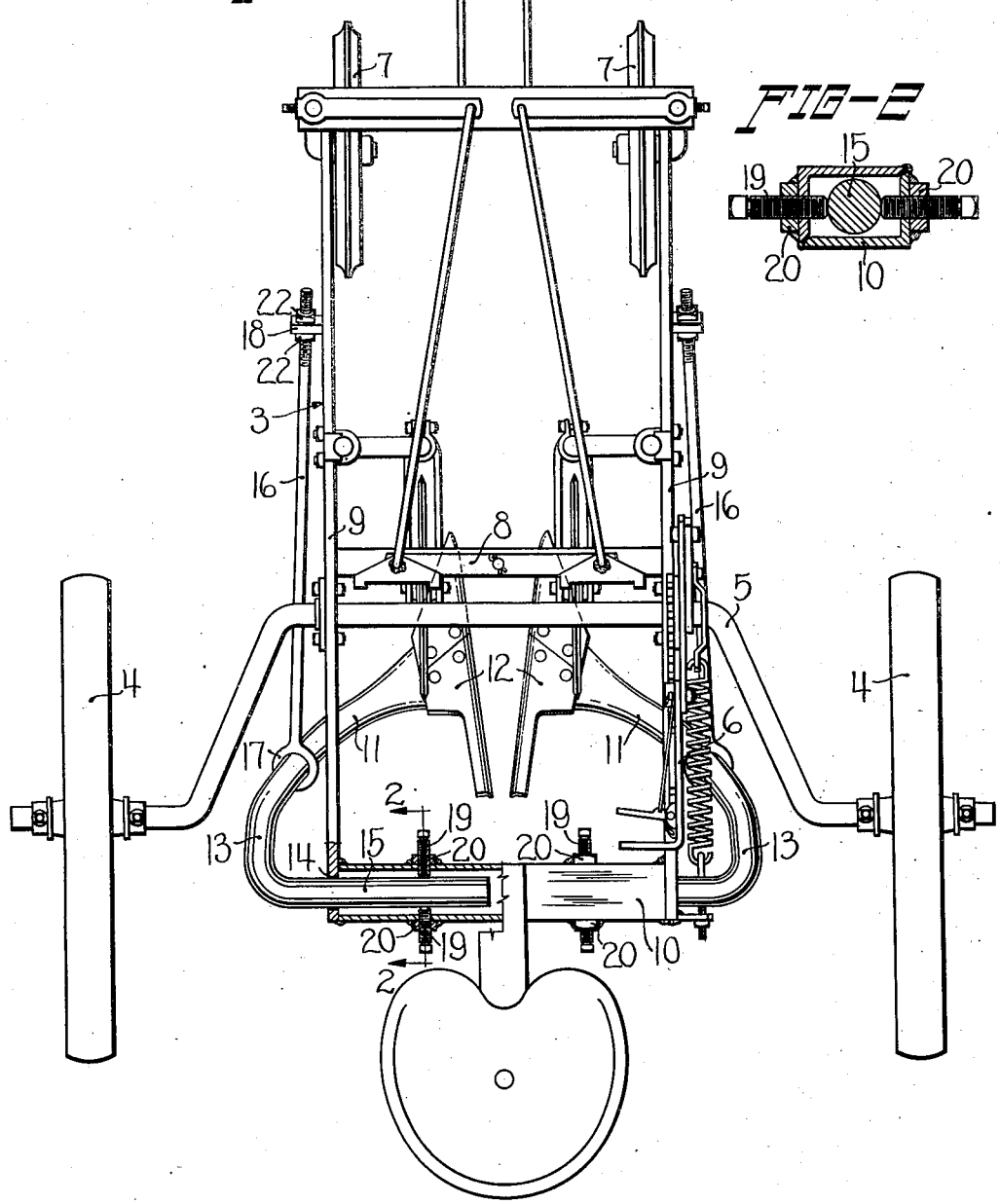

2,119,835

UNITED STATES PATENT OFFICE 2,119,835

BLADE ADJUSTMENT MECHANISM

Miles H. Tuft, Moline, Ill., assignor to Deere & Company, Moline, Ill., a corporation of Illinois Application September 14, 1935, Serial No. 40,586
Renewed November 16, 1936

20 Claims. (Cl. 55—106)

The present invention relates to improvements in agricultural implements equipped with earth-engaging members or blades, and more particularly to implements of this character wherein it is desirable to adjust the blades in various positions, such as beet lifters and the like.

Implements of this type have heretofore included blade supporting means for both a transverse and a rocking longitudinal movement. Under this arrangement the blade was movable transversely to occupy selected positions in fixed angular relation to the line of advance. By oscillating the blade in the plane determined by the selected transverse position thereof, its endwise inclination could be varied. The angular relation of the face of the blade, however, with respect to the line of advance, remained constant.

Blades, of the type adapted for use on beet lifters and the like, are provided with a forwardly and downwardly inclined face to form an earth penetrating point. The rear portion of the blade projects rearwardly in the form of a narrow runner, which is adapted to lift and hold the beet in raised position while the soil drops away from the beet. In operating an implement of this character, the operator must accurately guide the implement so that the blade will be brought sufficiently near to the beet to properly loosen the soil around the beet and force the beet upwardly and yet allow sufficient distance for the point to escape contact with the beet and to avoid cutting or bruising the beet. Operators having an excess of draft power available for drawing the implement have frequently sought to obviate the necessity of accurately following a narrow course by widening the distance between the points of the blades. This was accomplished by a transverse movement of the blade, whereby the angular relation of the face of the blade remained constant and the space between the rear end of the runners of the blades consequently widened in the same degree. It has been found, however, that for most efficient operation in any one field, the rear ends of the runners must be a certain fixed distance apart. It has accordingly been found desirable to provide for increasing the space between the leading edges of the blades and yet maintain the width of space between the rear ends of the runners constant so as to maintain the lifting efficiency of the blades. It is therefore an object of this invention to provide an implement such as a beet lifter or the like with mechanism for adjusting the blades angularly relative to the line of advance, as well as for adjusting the blades in parallel planes. By adjusting the angular position of the blades relative to the line of advance, and at the same time making a compensating adjustment of blades in parallel planes, the distance between the points of the blades can be varied, yet the rear ends of the runners held at a fixed distance apart.

Figure 1 is a plan view of an implement embodying the present invention, with parts broken away to illustrate the blade adjusting mechanism in neutral position; and, Figure 2 is an enlarged sectional view through the adjusting mechanism, as shown in Fig. 1, such view being taken substantially along the line 2—2 of Figure 1.

Referring to the drawing, 3 represents the frame of a conventional beet puller or the like mounted on wheels 4. Wheels 4 are journaled on a crank axle 5 which can be rocked to raise and lower the implement by means of a lever 6. The front end of the implement is supported on a pair of dirigible wheels 7 steered by foot controlled steering device 8.

Frame 3 comprises side members 9 and a rear cross bar 10. The rear cross bar 10 comprises a hollow member formed by inverting an angle member relative to a second member and welding or otherwise fastening the members at their abutting edges to form a body of rectangular cross section, as shown in Figure 2. A pair of beams 11 are provided at their respective lower ends with suitable blades 12. Each of the beams 11 is bent to form upwardly and outwardly bent portions 13 terminating in horizontal cylindrical sections 15 bent inwardly at right angles to the median line of the implement. Sections 15 of the respective beams 11 are adapted to be inserted through circular openings 14 in side members 9 and extend into opposite ends of the hollow cross bar 10. The forward ends of a pair of braces 16 are threaded and extend through perforations in brackets 18. At their lower ends these braces have collars 17, which embrace the beams 11. A pair of nuts 22 disposed on oposite sides of brackets 18 are provided on each brace. By adjusting nuts 22 the beams may be rocked to adjust the endwise inclination of the blade 12.

The inner side walls of the hollow cross bar 10 are spaced sufficiently from the adjoining surface of the beam sections 15 to allow relative lateral movement of the beams 11. Openings 14 serve as bearing portions or pivots for the beams in shifting the position thereof with respect to the adjacent wall of the cross bar 10. By laterally swinging the beam into selected positions within the limits defined by the side walls of the cross bar 10 about openings 14 as a pivot, the angular position of the blades 12 with respect to the line of advance may be adjusted. Beam sections 15 may also be shifted axially within cross bar 10 for adjusting blade 12 transversely in parallel planes.

In order to control the movement of the beam relative to the cross bar 10, any suitable adjusting mechanism may be employed. In the preferred embodiment of my invention, as illustrated in the drawing, each of the side walls of the cross bar 10 is perforated to receive a threaded bolt 19. Bolts 19 are screwed into nuts 20 fixed to the side walls of the cross bar in alignment with the perforations in the cross bar. The inner ends of the oppositely arranged bolts 19 abut against the corresponding adjoining surfaces of the beam section 15, and by turning the respective bolts 19, so as to advance the inner end of each toward that of the other, the beam section 15 is securely held therebetween. Obviously, by turning one bolt 19 so as to cause the inner end of said bolt to recede, the opposite bolt 19 may be tightened to cause its inner end to advance, whereby the beam section 15 will be caused to pivot about opening 14 and assume a new angular position relative to the side walls of the cross bar 10.

It will be noted that as the bolts 19 are adjusted to press the beam section 15 toward the forward side wall of the cross bar 10, the beam sections 11 and the blades 12 will be swung about the openings 14. This operation will cause the points of the blades to move outwardly. Since the rear ends of the runners are relatively close to the transverse vertical plane passing through the openings 14, this swinging of the beam sections will cause only a slight separation of the rear ends of the runners. Hence, in angularly adjusting the respective beam sections 11 to increase or decrease the distance of separation between the points of the cooperating blades, the relative position of the runners will be only slightly altered whereby their lifting efficiency may be retained. If, however, it is desired to compensate for this slight change in the spacing of the rear ends of the runners, it can be done by merely shifting the beam sections 15 axially slightly at the time the angular adjustment of the beams 11 is made.

What I claim is:

1. In an agricultural implement comprising a wheel supported frame, a pair of beams separately supported on said frame for angular adjustment about laterally spaced vertically disposed axes, a blade carried by each beam having a point and a rearwardly extending runner, said blade being so disposed on its beam that a vertical plane passing through the point of said blade and the axis about which the beam upon which it is mounted may be angularly adjusted defines an angle with respect to a longitudinal vertical plane of the implement, which is appreciably smaller than the angle between the latter plane and a vertical plane passing through the rear end of the runner and said axis of angular adjustment, whereby when said beams are angularly adjusted the variation in the distance between the points of said blades is appreciably greater than the variation in the distance between the rear ends of said runners.

2. In an agricultural implement comprising a wheel supported frame, a blade supporting beam, a bearing for said beam having an opening defined by a surface in relatively close contact with the adjoining surface of the beam, and an opening defined by a surface spaced sufficiently from the adjoining surface of the beam to allow angular movement of the beam relative to a central vertical plane through said openings, and means for adjusting said beam angularly with respect to said plane.

3. In an agricultural implement, the combination with a wheel supported frame, of blade supporting beams having horizontal arms perpendicular to the median line of the implement, a bearing for said arms having a circular opening at its outer end and a body having vertical walls defining an opening of relatively larger cross section, and means associated with the vertical walls of said body for swinging said arm about said circular opening into selected position within limits defined by the vertical walls of said body.

4. In a beet lifting implement, the combination with a wheel supported frame comprising a pair of side members having circular openings adjoining their rear ends, a hollow cross bar having vertical walls defining an opening having a cross section relatively larger than and in communication with said circular opening, beams having horizontal cylindrical sections bent inwardly at right angles to the median line of the implement disposed in said circular opening and extending into the ends of said hollow cross bar, blades rigidly mounted on the external portion of said beams, braces engaging the external portions of said beams for rocking said beams to vary the endwise inclination of said blades, and threaded means penetrating the vertical walls of said cross bar and bearing against the section of the beams disposed within said cross bar for moving said beams to increase or decrease the lateral inclination of said blades.

5. In an agricultural implement comprising a wheel supported frame, a blade supporting beam, a bearing for said beam comprising two sections of angle iron secured in rigid relation to form a body of rectangular cross section, means for restricting the opening defined by the body at its outer end to form a bearing in relatively close contact with the adjoining surface of the beam, and means for moving the beam angularly with respect to a central vertical plane through said bearings.

6. In combination with an agricultural implement having a frame, a pair of oppositely disposed blade-supporting beams, journal means for supporting said beams on said frame, said supporting means defining a fulcrum for each of said beams, respectively, for swinging movement about axes substantially perpendicular to the axes of said journal means, said beams being slidable toward and away from each other in said journal means for adjusting the lateral spacing between the beams, and means for fixing said beams in laterally and angularly adjusted position.

7. In combination with an agricultural implement having a frame, a pair of cooperatively converging blades, a pair of bent beams, each beam supporting one of said blades at one end thereof, respectively, journal means for supporting said beams on said frame, said means defining a fulcrum near the other end of each respective beam, said beams being rotatable in parallel planes about the axes of said journal means, swingable about said fulcrums to adjust the angle of convergence of said blades, and slidable in said journal means to adjust said blades toward and away from each other, and means for fixing said beams in adjusted position.

8. In combination with an agricultural implement having a frame, a pair of substantially U-shaped blade-supporting beams, means for supporting said beams on said frame, said supporting means defining a fulcrum on one arm of each beam, respectively, and means for angularly adjusting each of said beams about a substantially vertical axis through its respective fulcrum.

9. In combination with an agricultural implement having a frame, a pair of opposed substantially U-shaped beams, means for supporting said beams on said frame, said supporting means defining a fulcrum on one arm of each beam, respectively, means engaging said arm for adjustably setting the angular position of each of said beams about a substantially vertical axis passing through its respective fulcrum, and a pair of opposed cooperative earth-engaging blades supported on the other arms of said beams, respectively.

10. In combination with an agricultural implement having a frame, a pair of opposed cooperatively converging blades disposed longitudinally of said implement, a pair of substantially U-shaped supporting beams, each of said blades being mounted on one arm of one of said beams, respectively, means for supporting said beams on said frame, said means defining a fulcrum on the other arm of each of said beams, respectively, and means for adjusting said beams about said fulcrums, to adjust the angle of convergence of said blades.

11. In combination with an agricultural implement having a frame, a pair of opposed cooperatively converging blades disposed longitudinally of said implement, a pair of substantially U-shaped supporting beams, each of said blades being mounted on one arm of one of said beams, respectively, means for supporting said beams on said frame, said means defining a fulcrum on the other arm of each of said beams, respectively, means engaging the last-mentioned arms for adjusting said beams about said fulcrums to adjust the angle of convergence of said blades, and additional supporting means for each of the first-mentioned arms, said additional means having means for compensating for angular adjustment of said beams.

12. In combination with an agricultural implement having a frame, a pair of opposed cooperatively converging blades disposed longitudinally of said implement, a pair of substantially U-shaped supporting beams, each of said blades being mounted on one arm of one of said beams, respectively, means for supporting said beams on said frame, said means defining a fulcrum on the other arm of each of said beams, respectively, means for adjusting said beams about said fulcrums to adjust the angle of convergence of said blades, and means for laterally adjusting said arms to adjust the lateral spacing of said blades relative to each other.

13. In an agricultural implement, a frame, a bearing support fixed on said frame, a blade-supporting beam having a horizontal bearing portion supported in said bearing supports and swingable vertically and horizontally therein, and a second support for the beam spaced along said bearing portion from said bearing support and restraining the portion of said beam supported thereby against vertical movement, said second support including means for adjustably restraining said portion against horizontal movement, whereby said beam may be angularly adjusted relative to a vertical plane.

14. In an agricultural implement having a frame, a pair of opposed substantially U-shaped blade-supporting beams, means for supporting said beams on said frame, said supporting means defining a fulcrum on one arm of each beam, respectively, said beams being rotatable in said supporting means about their longitudinal axes and about axes passing through said supporting means substantially perpendicular to said longitudinal axes, respectively, said beams being slidable longitudinally on said supporting means, said blades being adjustable relative to each other and to the line of advance of said implement by virtue of said rotatability and slidability of said beams, and means for rigidly fixing said beams relative to said frame in adjusted position.

15. In a beet lifting implement having a frame, a pair of opposed substantially U-shaped beams, each of said beams comprising a downwardly and forwardly extending arm and a transversely extending arm, a pair of cooperative earth-engaging blades disposed on said first-mentioned arms, respectively, supporting means for each of said transversely extending arms, the latter being slidably supported in said supporting means to provide adjustment of said blades laterally relative to each other, said arms being journaled in said supporting means to provide vertical adjustment of said blades, said arms being pivotable in said supporting means about substantially vertical axes to provide adjustment of the angle of convergence of said blades, and means for rigidly fixing said blades in adjusted position.

16. In an agricultural implement comprising a frame, a blade supporting beam, a tubular supporting member fixed to said frame, a portion of said beam extending into said tubular member and fitting loosely therein, means for restricting the end opening of said member to form a bearing in relatively close contact with the beam for supporting the latter for swinging movement about an axis intersecting the axis of said beam portion within the supporting member, and means coacting with said tubular member for adjustably fixing the position of said portion of the beam within said tubular member.

17. In an agricultural implement comprising a frame, a blade supporting beam, a tubular supporting member fixed to said frame, a portion of said beam extending into said member, a support for said beam adjacent the end of said tubular member providing for swinging movement of said portion of the beam within said tubular member, and means coacting with said member for adjustably fixing the position of said portion of the beam within the tubular member.

18. In an agricultural implement comprising a frame, a blade supporting beam, a tubular supporting member fixed to said frame, a portion of said beam extending into said member, a support for said beam adjacent the end of said tubular member providing for swinging movement of said portion of the beam within said tubular member, said member having threaded apertures in the walls thereof, and bolts adjustably disposed in said apertures and in engagement with said beam portion for fixing the position of the latter within said tubular member.

19. In an agricultural implement, a frame, a bearing support fixed on said frame, a tool supporting beam having a bearing portion supported in said bearing support and swingable vertically and horizontally therein, and a second support for the beam spaced along said bearing portion from said bearing support, said second support including means for restricting swinging movement of said beam to movement in a certain path, and adjustable means for fixing said beam selectively at various points in said path.

20. In an implement of the class described, including a fore and aft extending frame, a pair of earth engaging blades disposed in longitudinally converging relation with respect to said frame, a single beam for supporting each of said blades, and means for mounting said beams on said frame providing for angular adjustment of said beams relative to said frame about laterally spaced, vertically extending axes through said mounting means and disposed rearwardly of said blades, whereby angular adjustments of said beams effect appreciably greater lateral adjustments of the forward portions of said blades than of the rear portions thereof.

MILES H. TUFT.